United States Patent

[11] 3,615,581

[72] Inventors: Karlheinz Kabitzke, Koeln-Buchheim; Horst Nickel, Leverkusen; Justus Danhauser, Koeln-Buchheim; Erich Bockly, Leverkusen, all of Germany
[21] Appl. No.: 728,886
[22] Filed: May 14, 1968
[45] Patented: Oct. 26, 1971
[73] Assignee: AGFA-Gevaert Aktiengesellschaft, Leverkusen, Germany
[32] Priority: May 22, 1967
[33] Germany
[31] A55771

[54] PHOTOGRAPHIC MATERIAL FOR THE SILVER DYE BLEACH PROCESS
11 Claims, No Drawings

[52] U.S. Cl. .................................. 96/99, 96/73, 260/174, 260/175
[51] Int. Cl. .................................. G03c 1/10
[50] Field of Search .................................. 96/99

[56] References Cited
UNITED STATES PATENTS

| | | | |
|---|---|---|---|
| 2,420,631 | 5/1947 | Taylor | 96/99 |
| 2,612,496 | 9/1952 | Gaspar et al. | 96/99 |
| 3,157,508 | 11/1964 | Dreyfuss | 96/99 |
| 3,467,522 | 9/1969 | Freytag et al. | 96/99 |

*Primary Examiner* — J. Travis Brown
*Attorney* — Connolly and Hutz

ABSTRACT: Very effective cyan dyes for photographic silver dye bleach process have the formula

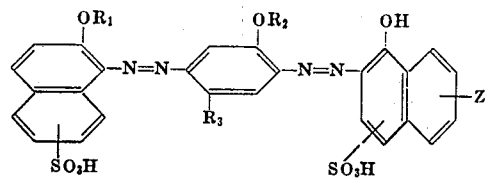

PHOTOGRAPHIC MATERIAL FOR THE SILVER DYE BLEACH PROCESS

Dyes for the known silver dye bleach process have to meet very high requirements. These dyes must be spectrally suitable, the absence of absorption in unwanted spectral regions next to the position of the absorption maximum being of particular significance. In addition, they must be able to be bleached rapidly and completely. The bleaching of cyan should not pass through red monoazo intermediate stages which may cause the formation of a disturbing red fog. The dyes must be resistant to diffusion in the binder used, which, in practically all cases is gelatin, and must as far as possible inert to the photographic emulsion. In addition, they should be fast to light.

Numerous cyan dyes have already been described but they do not meet these practical requirements. These dyes generally have unduly high side absorptions in the green and blue regions of the spectrum and insufficient absorption in the long wave region above 600 m$\mu$. For optimum color reproduction cyan dyes must have an absorption maximum at wavelengths longer than 620 m$\mu$ and an absorption curve which drops steeply towards the short-wave region.

It is among the objects of the invention to provide cyan azo dyes for use in the silver dye bleaching process, which dyes have an absorption maximum at a considerably longer wavelength, about 640 to 710 m$\mu$, and which are suitable for the silver dye bleach process.

We now have found that dyes of the following formula are excellently suitable for the silver dye bleach process:

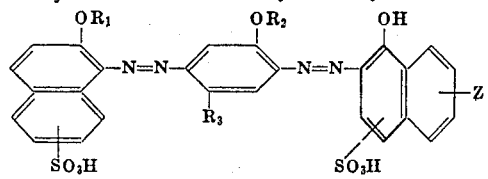

wherein $R_1$ = hydrogen, alkyl, hydroxyalkyl or alkoxyalkyl, the alkyl groups having preferably up to three carbon atoms such as methyl, ethyl or propyl;

$R_2$ = alkyl, alkoxyalkyl, hydroxyalkyl or hydroxyalkyl where the hydroxy is esterified with an aliphatic carboxylic acid having preferably up to five C-atoms, the above alkyl groups having preferably up to three carbon atoms;

$R_3$ = hydroxy, alkyl, alkoxy, hydrogen substituted alkoxy, hydroxy substituted alkoxy where the hydroxy group is esterified with an aliphatic carboxylic acid containing preferably up to five carbon atoms, more particular with a dicarboxylic acid containing up to five carbon atoms, alkoxyalkyl or alkoxyalkoxy; each of the above alkyl groups having preferably up to three carbon atoms;

= amino, acylamino in the 2,3- or 4-position of the 8-hydroxynaphthalene ring, or an aryl urea group such as a phenyl urea group. Preferred are acylamino where the acyl group is derived from an aliphatic carboxylic acid having up to five carbons or an aromatic carboxylic acid, or a sulfonic acid such as a benzene sulfonic acid, more particular from carboxylic acids of the benzene series such as benzoic acid, which may be substituted, for example, with halogen such as chlorine or bromine, alkyl with preferably up to five C-atoms, halogenated alkyl such as $CF_3$, amino such as alkyl or acylamino groups or alkoxy with preferably up to five C-atoms.

The naphthalene nuclei can also contain further substituents such as additional sulphogroups.

Those dyes of the above formula in which $R_3$ denotes an alkoxy or alkoxyalkoxy group are preferred.

Suitable dyes include those of the following formulas:

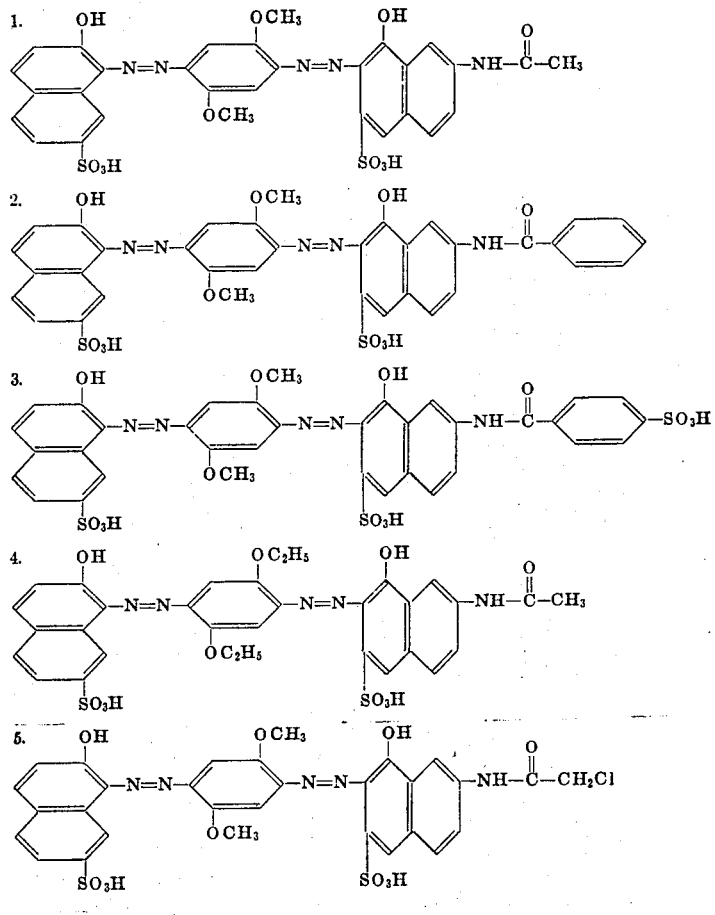

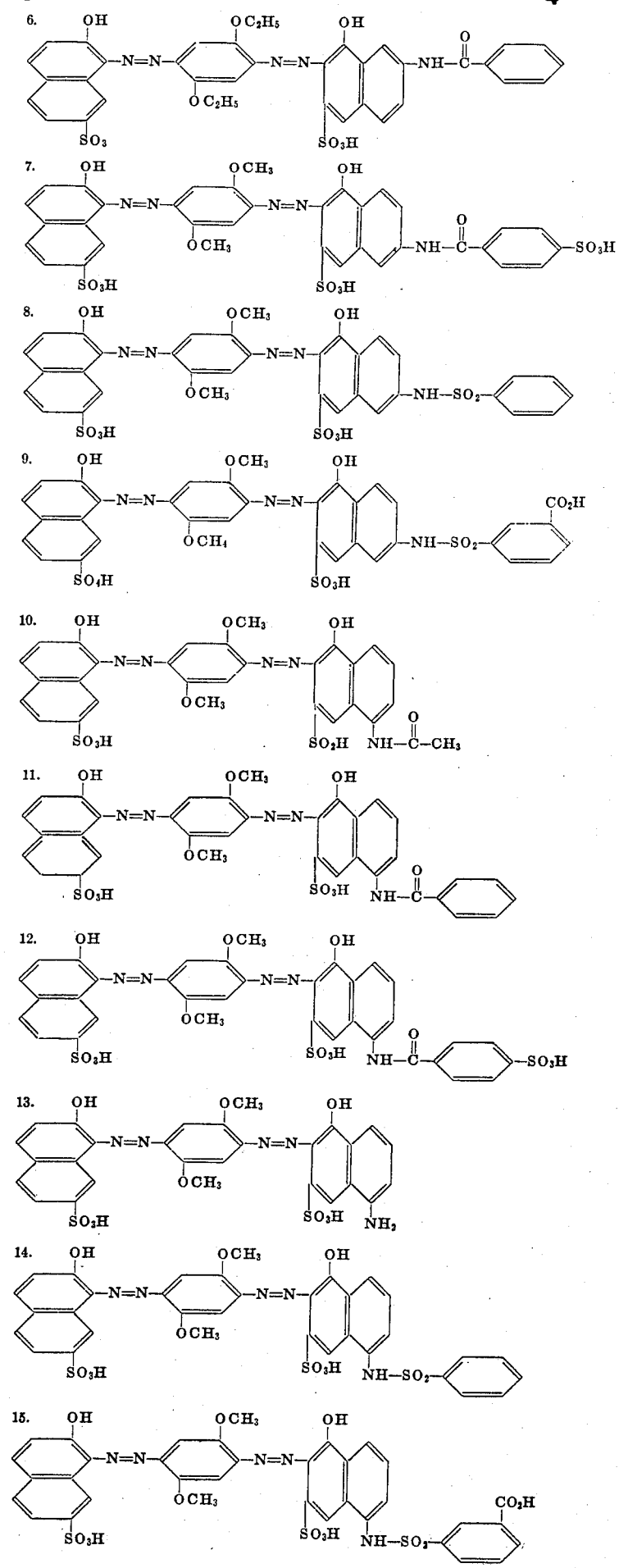

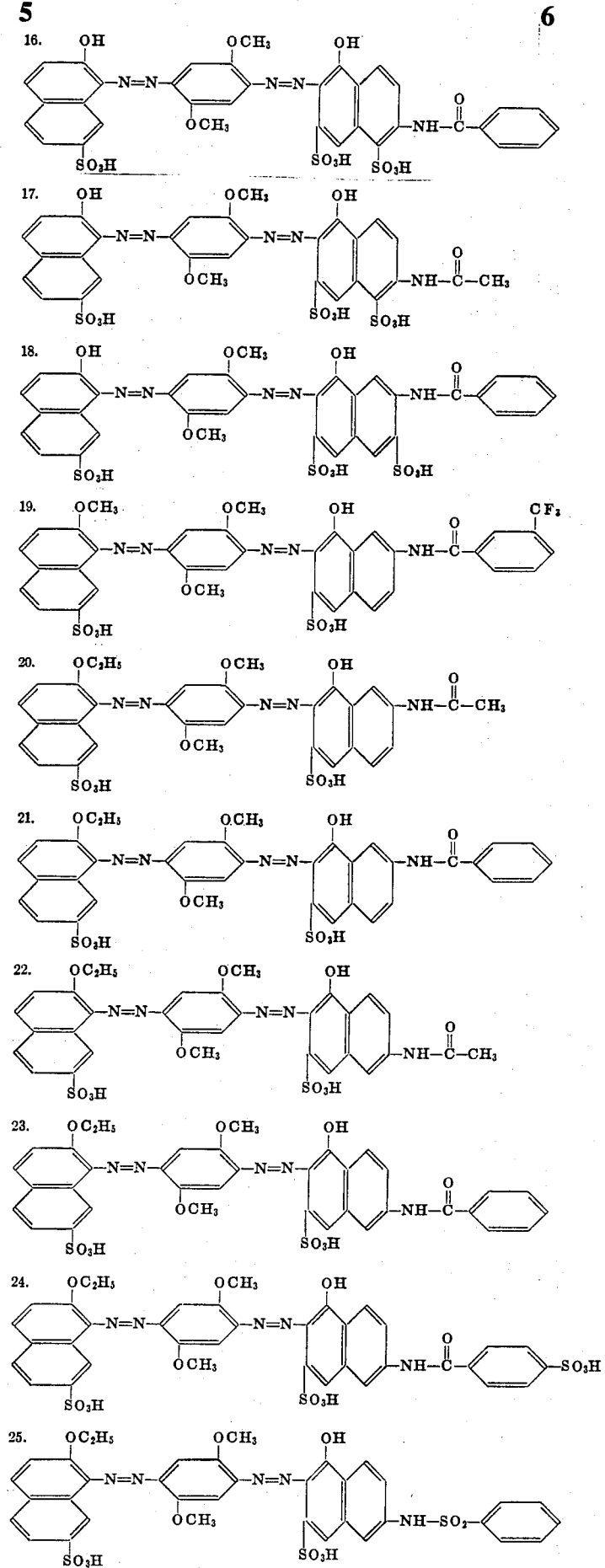

26. 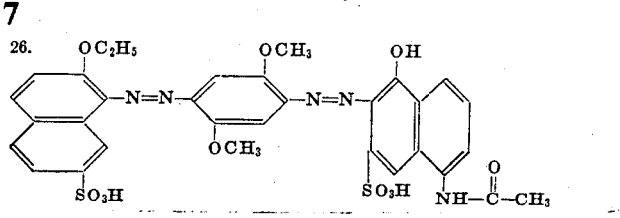
27. 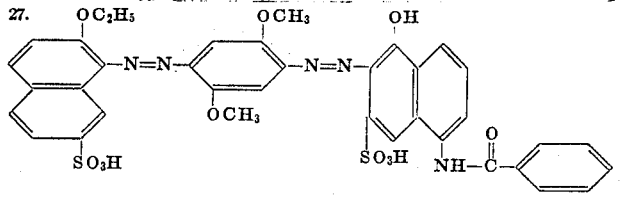
28. 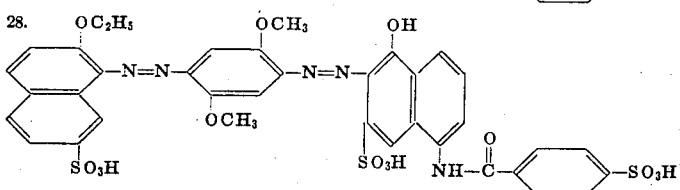
29. 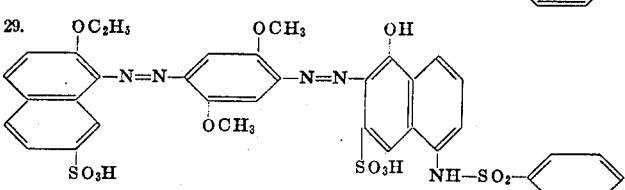
30. 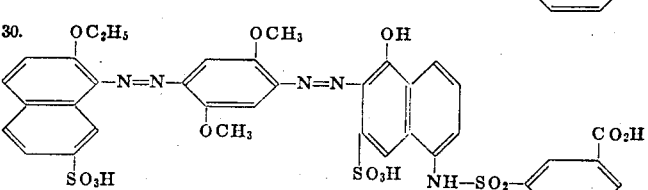
31. 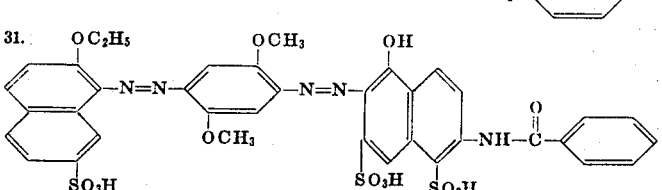
32. 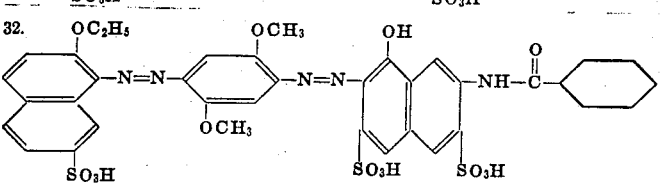
33. 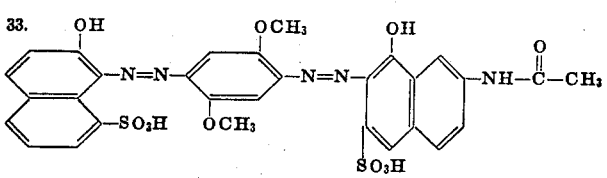
34. 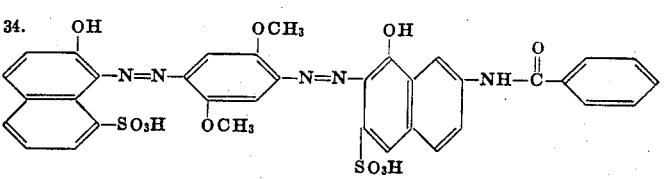
35. 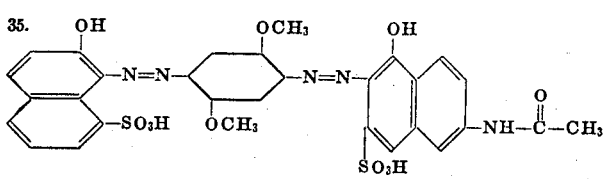

36. 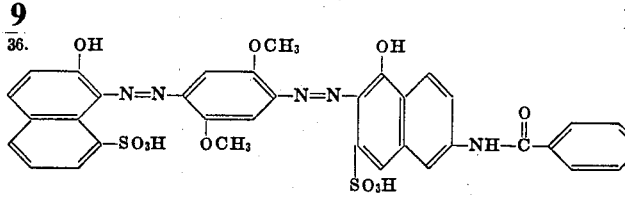
37. 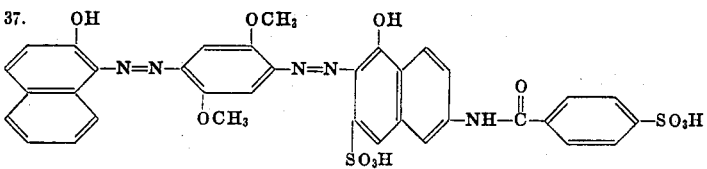
38. 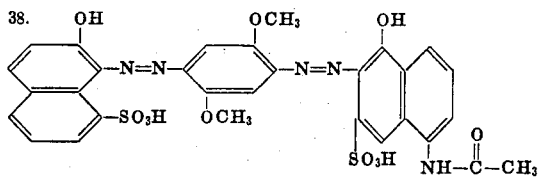
39. 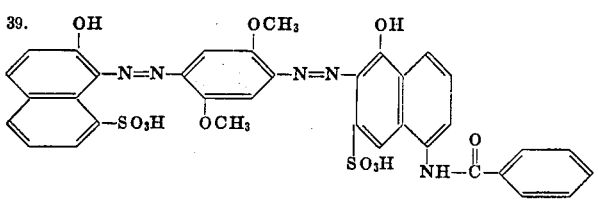
40. 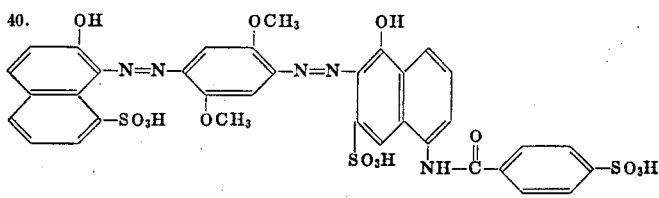
41. 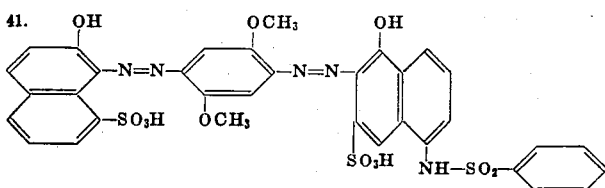
42. 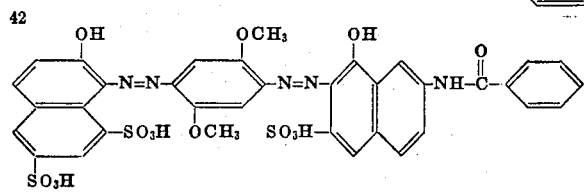
43. 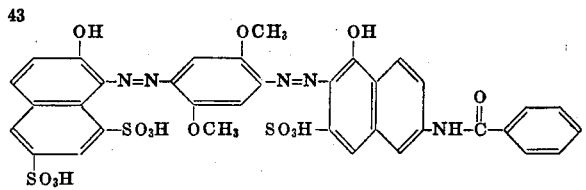
44. 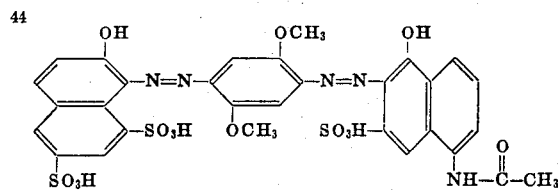

45. 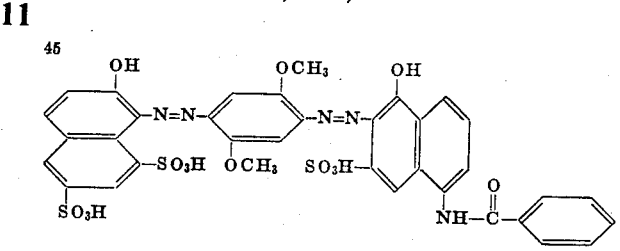
46. 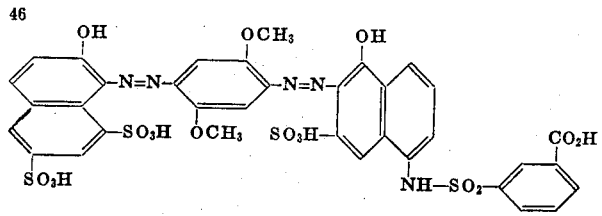
47. 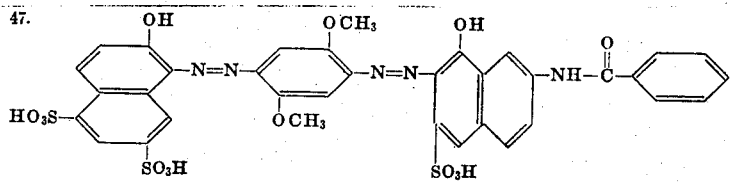
48. 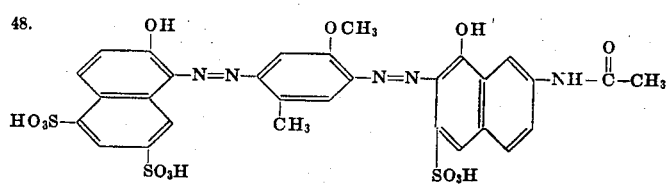
49. 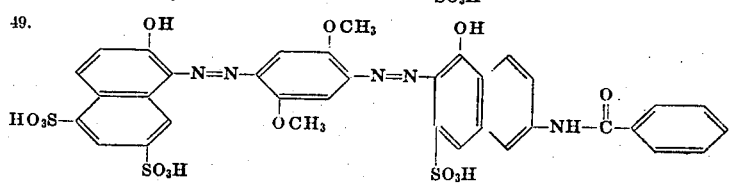
50. 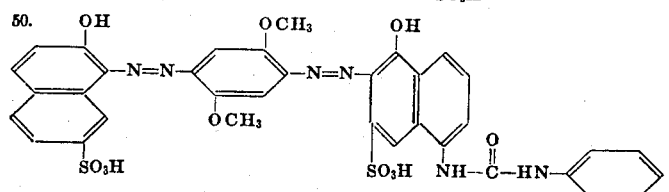
51. 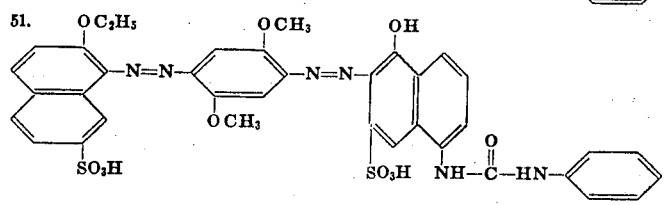
52. 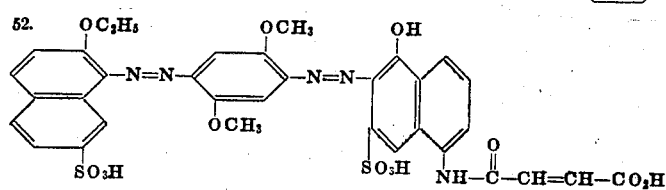
53. 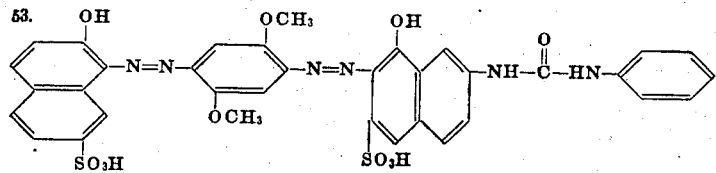

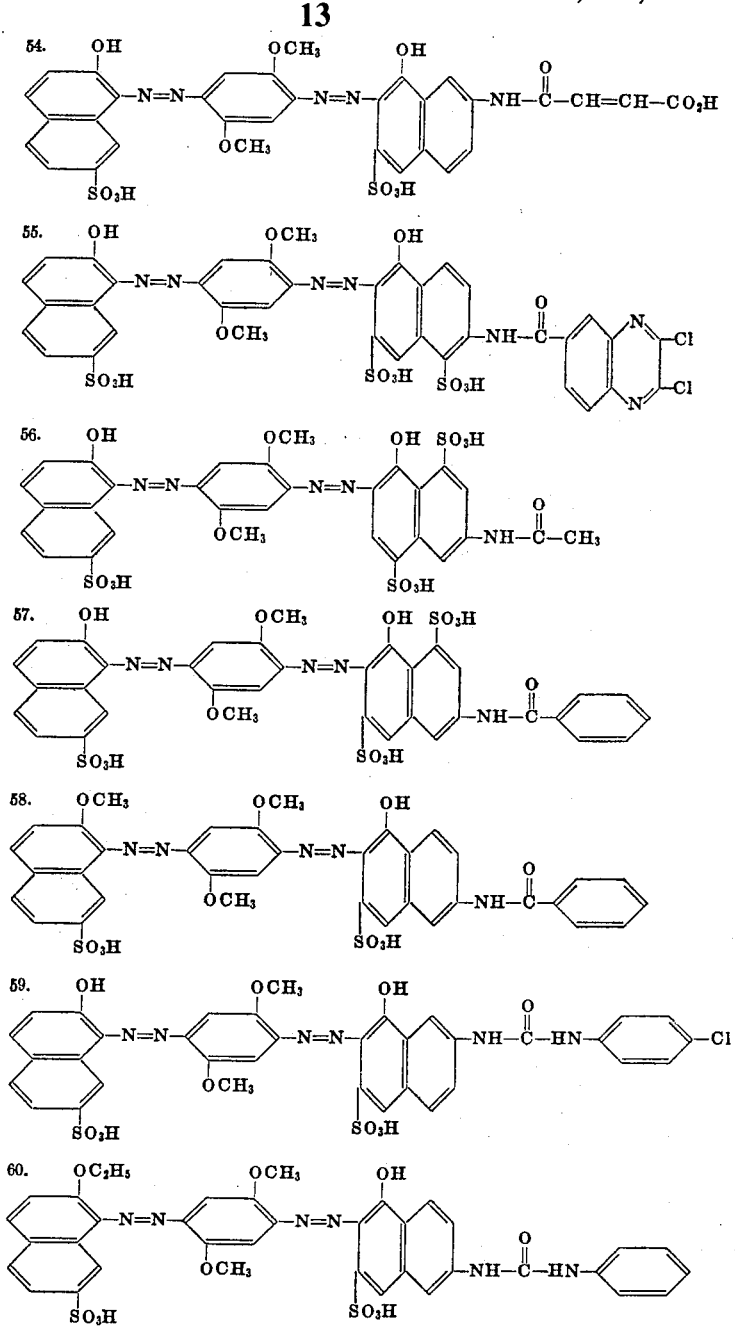

The dyes according to the invention are made according to common practice, for example as follows:

Dye 21

1-Amino-2-ethoxynaphthalene 7-sulfonic acid (A) is diazotized indirectly and coupled with 1-amino-2,5-dimethoxybenzene (B). The aminoazo dye so obtained is indirectly diazotized and coupled again, this time with 2-benzoylamino-8-hydroxynaphthalene-6-sulfonic acid (C).

Dye 10

1-Amino-4-acetamino-2,5-dimethoxybenzene is diazotized and coupled with 2-hydroxy-naphthalene-sulfonic acid-(7) and the acetyl group is then saponified. The resulting aminoazo dye is indirectly diazotized and coupled with 4-acetylamino-8-hydroxy-naphthalene-6-sulfonic acid.

The following compounds are examples of suitable 2-hydroxy- or alkoxy-naphthalene components (A):

1-Amino-2-methoxy-naphthalene-7-sulfonic acid; 1-amino-2-β-ethoxy-ethoxynaphthalene-7-sulfonic acid; 1-amino-2-methoxynaphthalene-6sulfonic acid; 1-amino-2-ethoxy-naphthalene-7-sulfonic acid; 1-amino-2-hydroxynaphthalene-5,7-di-sulfonic acid; 1-amino-2-hydroxynaphthalene-8-sulfonic acid; and 1-amino-2-hydroxynaphthalene-6,8-disulfonic acid.

The following are examples of compounds which can be used as the coupling components (B) of the trinuclear bis-azo dye;

1-Amino-2-methoxy-5-methylbenzene; 1-amino-2-methoxybenzene; 1-amino-2,5-dimethoxybenzene; 1-amino-2,5-di-(hydroxy-ethoxy)-benzene; 1-amino-2,5-dimethoxybenzene; 1-amino-2,5-di(glutaroyl-hydroxy-ethoxy)-benezene; 1-amino-2-hydroxyethoxybenzene; 1-amino-2-hydroxy-ethoxy-5-methylbenzene and 1-amino-2-ethoxy-ethoxy-5-methylbenzene.

The following compounds can inter alia be used as 8-hydroxynaphthalene components (C):

2-Acetylamino-8-hydroxy-naphthalene-6-sulfonic acid; 2-benzoylamino-8-hydroxynaphthalene-6-sulfonic acid; 2(3'-trifluoromethylbenzoylamino)-8-hydroxy-naphthalene-6-sulfonic acid; 3-chloroacetylamino-8-hydroxynaphthalene-6sulfonic acid; 3-benzoylamino-8hydroxy-naphthalene-6sulfonic acid; 3-(3'- chlorobenzoylamino)-8-hydroxy-naphthalene-6sulfonic acid; 3-(4'-sulfobenzoylamino)-8-hydroxy-naphthalene-6-sulfonic acid; 3-benzene-sulfamino-8-hydroxy-naphthalene-6-sulfonic acid; 3-(3'-carboxybenzene-sulfamino)8-hydroxy-naphthalene-6-sulfonic acid; 4-acetylmaino-8hydroxy-naphthalene-6-sulfonic acid; 4-chloroacetyl-amino88-hydroxy-naphthalene-6sulfonic acid; 4-benzoyl-amino-8-hydroxy-naphthalene-6sulfonic acid; 4-(4'-sulfobenzoyl-amino)-8-hydroxy-naphthalene-6-sulfonic acid; 4-benzene-sulfamino-8hydroxynaphthalene-6sulfonic acid; 4-(3'-carboxybenzene-sulfamino)-8-hydroxy-naphthalene-6-sulfonic acid; 2-benzoylamino-8-hydroxynaphthalene-3,6-disulfonic acid; 3-acetylamino-8-hydroxynaphthalene-4,6-disulfonic acid; 3-benzoylamino-8-hydroxynaphthalene-4,6-disulfonic acid; 3-acetylamino- or 3-benzoylamino-8-hydroxynaphthalene-1,5-disulfonic acid; 2-acetyl-amino- or 2-benzoylamino-8-hydroxynaphthalene-5-sulfonic acid; 2- or 3- or 4-phenyl-ureido-8-hydroxynaphthalene-6sulfonic acid or ureido-8-hydroxynaphthalene compounds which are substituted with alkyl, halogen or sulfo in the phenyl nucleus.

With the high diffusion resistance of the dyes according to the invention, the adjustment between solubility of the dye in water and its diffusion resistance in the layer can be varied as best suited to the particular working conditions mainly by varying the different substituents R in the manner indicated. Therefore, by a suitable combination of substituents, the new dyes do not require any mordanting with organic bases such as aromatic dibiguanides or the like.

The particular working conditions depend mainly on the desired acid strength of the dye bleaching bath and the associated degree of hardening of the layers. This possibility constitutes a further advantage over known dyes of a similar type.

Another advantage lies in the high degree of purity in which the compounds according to the invention are obtained by the methods of preparation indicated, so that time-consuming purification by reprecipitation is not necessary.

Owing to their good spectral properties, their high fastness to light and the ease with which they can be bleached, combined with their low tendency to the formation of the red monoazo form in the case of only partial bleaching with low color densities, the dyes according to the invention are eminently suitable for all modification of the silver dye bleach process, e.g., a combination of the silver salt diffusion process and the silver dye bleach process suitable for the production of colored images with a characteristic curve opposite to that of the original, as well as for processes which comprise a black-white reversal development. As dye bleaching baths either thiourea baths can be used such as mentioned in British Pat. Nos. 397,159 and 507,211 and described, e.g., in German Auslegeschrift 1,041,355 or baths containing quinoline and iodide as indicated in U.S. Pat. Nos. 2,629,658 and 2,652,328.

The main advantage of the dyes of the present invention lies in absorption properties which are far better than those of known dyes. In this connection, it should be pointed out that it is particularly difficult to provide azo dyes which dissolved in a gelatin layer have an absorption maximum above 620 m$\mu$, and a very low side absorption in the blue region of the spectrum (400 to 500 m$\mu$). The short-wave part of the absorption curve [from the green region of the spectrum (500 to 600 m$\mu$)] is particularly important for clear and distinct reproduction of green because the human eye is especially sensitive in this region. Thus, for example, the absorption maxima in gelatin for the following dyes are: Dye No. 14 — 640 m$\mu$ Dye No. 12 — 650 m$\mu$ Dye No. 10 — 660 m$\mu$ and Dye No. 35 — 700 m$\mu$. The side absorptions in the blue region of the spectrum in these cases are very low.

The azo dyes of the present invention are added to a light-sensitive silver halide emulsion layer. The concentration of the dyes can be varied depending upon the concentration of the silver halide and the effects desired. In general we have found that 30 g. per mol of silver halide are sufficient for the purpose of our invention.

As binding agent for the silver halide emulsion layer the hydrophilic colloids can be used which are customarily employed for dispersing silver halides, for example, gelatin, alone or in combination with other proteins such as albumin, alginic acids and derivatives thereof such as alkali salts, polyvinyl alcohol, polyvinyl pyrrolidones, carboxy alkyl cellulose such as carboxymethyl cellulose etc.

The photographic emulsions may be coated on any of the customary supports for photographic material including paper, cellulose esters, such as cellulose acetate or nitrate, polystyrene, polyesters, in particular polyethylene terephthalate, polycarbonates, preferably of bis-hydroxy phenyl alkanes and the like.

The emulsions may be chemically sensitized by any of the accepted procedures. They can be treated with salts of nob metals such as ruthenium, rhodium, palladium, iridium or platinum. Suitable compounds are well known in the art. The emulsions can also be sensitized with gold salts as described by R. Koslowsky, Z.wiss.phot. 46, (1951), 62–72.

The emulsions employed can also be chemically sensitized with reducing agents, such as stannous salts, polyamines, sulfur compounds, such as described in U.S. Pat. No. 1,574,944, polyethylene oxides and the like.

The emulsions may also contain stabilizers such as organic mercury compounds, heterocyclic compounds, in particular mercapto substituted heterocyclic rings, such as triazoles, tetrazoles or azaindenes, which are disclosed, e.g., by Birr in Z.wiss.phot. Vol. 47, (1952), pages 2–28.

The emulsions can also be optically sensitized with sensitizing dyes customarily employed in the art of emulsion making, such as cyanines, merocyanines as described, e.g., by F. M. Hamer "The Cyanine Dyes and related Compounds" published by Interscience Publishers (1964).

It is preferred to use sensitizing dyestuffs from the merocyanine class, such as described, e.g., in Belgian Pat. Specification No. 659,657, and sulfo betaine cyanines.

The emulsion may also be hardened by any suitable hardener such as formaldehyde, halogen substituted aliphatic acids such as mucobromic acid and the like. In view of the treatment with the strongly acidic dye-bleaching bath, very active hardeners are preferred.

The emulsions may contain a suitable gelatin plasticizer such as ethylene glycol, other dihydroxy alkanes, pentaerythritol phosphoric acid esters as described in German Pat. No. 1,185,811 and the like.

EXAMPLE 1

300 ml. of a 3% gelatin solution which contains 1.7 g. of dye 12 and 0.4 g. of saponin are added to 500 ml. of a silver bromide gelatin emulsion containing 5 mol% of silver iodide. The emulsion is sensitized to red light with 12 mg. of the sensitizer according to example 11 of British patent specification 1,078,227, and is then applied onto a support of barytacoated paper. The application of silver is about 0.8 g. of Ag/m$^2$.

After drying, the film is exposed to yellow light behind a grey step wedge and processed as follows:
1. Developed for 5 minutes in a solution of
    1 g. of p-methylaminophenol
    13 g. of Na$_2$SO$_3$ anhydrous
    3 g. of hydroquinone
    26 g. sodium carbonate, anhydrous
    1 g. of potassium bromide in
    1,000 ml. of water.
2. Washed for 1 minute.
3. Fixed for 5 minutes in a solution of
    200 g. of sodium thiosulfate cryst.
    20 g. of potassium metabisulfite in
    1000 ml. of water.
4. Washed again for 5 minutes.
5. Hardened for 5 minutes in a solution of
    60 ml. of formalin (30%)
    5 g. of sodium bicarbonate in
    1000 ml. of water.
6. Washed for 5 minutes.
7. Dye-bleached for 15 minutes in a solution of
    10 g. of potassium iodide
    10 g. of sodium hypophosphite
    25 ml. of sulfuric acid 50 ml. of quinoline
10 mg. 2,3-dimethylquinoxaline in
1000 ml. of water.
8. Washed for 5 minutes.
9. Bleached for 5 minutes in a bath of
25 g. of copper chloride
5 ml. conc. hydrochloric acid in
1000 ml. of water.
10. Fixed for 10 minutes as under 2.
11. Washed for 20 minutes.

After drying, a diffusion-fast cyan dye wedge is obtained with perfect whites which do not discolor even after prolonged exposure. The steps of low color densities of the wedge do not show any reddish tinge and are highly fast to light.

EXAMPLE 2

The same procedure as employed in example 1 is used but the dye is replaced by 1.8 g. of dye 28 and the solution is applied onto a white pigmented cellulose triacetate.

After exposure and processing with baths 1 to 6 as in example 1, the procedure is continued as follows:
7. Dye-bleached for 5 minutes in a solution of
28 g. of thiourea
18 g. of potassium bromide
3 mg. of 2-amino-3-hydroxyphenazine
400 ml. of conc. hydrochloric acid in
1000 ml. of water.
8. Washed for 5 minutes.
9. Bleach-fixed for 10 minutes in a solution of
26 g. of tetrasodium-ehtylenediamine tetraacetate
24 g. of sodium carbonate, anhydrous
15 g. of ferric chloride
13 g. of sodium sulfite anhydrous
200 g. of sodium thiosulfate anhydrous
800 ml. of water.
10. Washed for 20 minutes.

A result quite similar to that in example 1 is obtained. Both layers are eminently suitable as part of a color photographic three-layered material.

EXAMPLE 3

The same procedure as described in example 1 is employed but instead of the dye indicated there, approximately equal amounts of one of dyes 10, 11, 36 or 60 is used. Similar results are obtained as in example 1 after exposure and processing.

EXAMPLE 4

The same procedure as described in example 2 is employed but after exposure, processing is as follows:
1. Developed for 5 minutes in a bath as indicated in example 1;
2. Washed for 1 minute;
3. Bleached for 1 minute in a solution of
10 g. of potassium dichromate
5 g. of conc. sulfuric acid in
800 ml. of water.
4. Washed for 1 minute;
5. Clarified for 1 minute in a bath of
5 g. of sodium sulfite anhydrous in
1000 ml. of water.
6. Washed for 1 minute;
7. Second exposure for 2.5 minutes with a 40 Watt lamp at 20 cm. distance;
8. Second development as under 1.
9. Hardening and subsequent processing as in example 1 with baths 5 to 11.

A cyan dye wedge with gradation opposite to that of the original is obtained.

EXAMPLE 5

A color photographic multilayer material for the silver-dye-bleach process is prepared as follows:

The layers indicated below are arranged successively on a support of baryta-coated paper:
1. A red sensitized layer as indicated in example 1;
2. An intermediate layer applied from a 2% gelatin solution;
3. A green sensitized layer which contains per 500 g. of a silver bromide gelatin emulsion having a silver iodide content of 3 mol%, 15 mg. of a sensitizer described in example 2 of British Pat. No. 1,064,037 and 2.5 g. of the dye of the following formula:

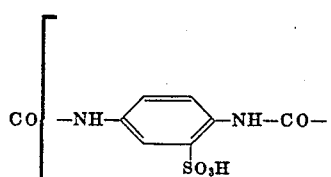

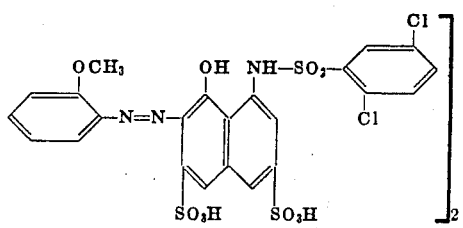

dissolved in 250 ml. of a 2% gelatin solution which also contains the usual quantities of hardening agents (e.g. 4 ml. of a 30% aqueous formaldehyde solution) and 0.4 g. of saponin. The silver concentration is 0.8 g./m.$^2$;
4. An intermediate layer applied from a 2% aqueous gelatin solution;
5. A yellow filter layer (optical density 0.5 for a layer thickness of 1 mm.) obtained from a 2% gelatin solution;
6. An intermediate layer applied from a 2% gelatin solution;
7. A nonsensitized silver halide gelatin emulsion layer containing 25 g. of silver bromide per kg. and per 500 g. 5 g. of a yellow dye of the following formula:

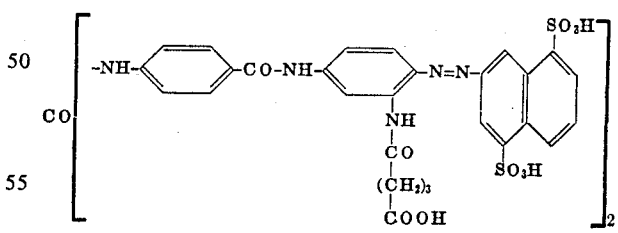

in addition to the usual quantities of hardening agents (4 ml. of a 30% aqueous formaldehyde solution) and 0.5 g. of saponin. The silver concentration is about 0.7 g./m.$^2$;
8. A protective layer applied from a 2.5% aqueous gelatin solution.

Processing

After drying, the film is exposed behind a multicolored transparency and processed as described in example 1, with the exception that 50 mg. of 2,3-dimethylquinoxaline are added to the bleaching bath and the treatment time is increased to 20 minutes.

After washing with water and drying, a reproduction in true colors of the original is obtained. The resulting color photographic image has an unusual brilliancy.

We claim:
1. A light-sensitive silver halide emulsion dyed with an azo dye of the following formula:

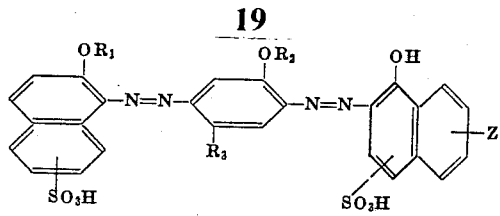

wherein:

R₁ hydrogen, alkyl, hydroxyalkyl or alkoxyalkyl;
R' alkyl, alkoxyalkyl, or hydroxyalkyl;
R hydrogen, alkyl, alkoxy substituted alkyl, alkoxy, or alkoxy substituted alkoxy;
Z acyl amino or an aryl urea group, in the 2-, 3- or 4-position of the 8-hydroxy naphthalene ring.

2. Light-sensitive material as defined in claim 1 wherein R represents hydrogen or alkyl having up to three carbon atoms.

3. Light-sensitive material as defined in claim 1 wherein R' represents alkyl having up to three carbon atoms and R represents alkoxy having up to three carbon atoms.

4. Light-sensitive material as defined in claim 1 wherein Z stands for acyl amino the acyl group of which is derived from an aliphatic carboxylic acid having up to five carbon atoms.

5. Light-sensitive material as defined in claim 1 wherein Z stands for a phenyl urea group, benzoyl-amino or a benzene sulfonylamino group.

6. A light-sensitive material as defined in claim 1 wherein the azo dye has the following formula:

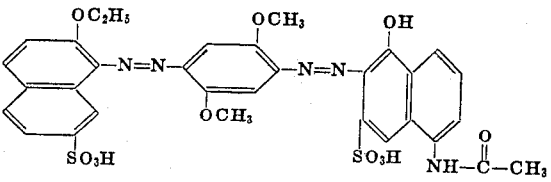

7. A light-sensitive material as defined in claim 1 wherein the azo dye has the following formula:

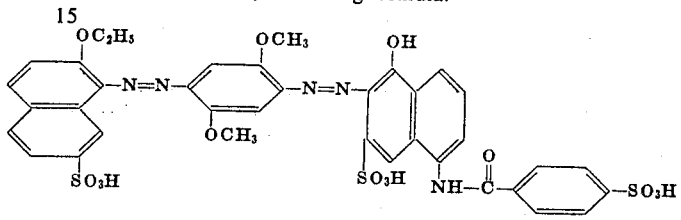

8. A light-sensitive material as defined in claim 1 wherein the azo dye has the following formula:

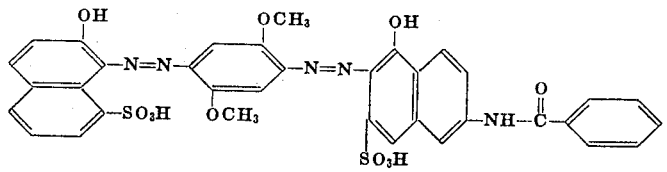

9. A light-sensitive material as defined in claim 1 wherein the azo dye has the following formula:

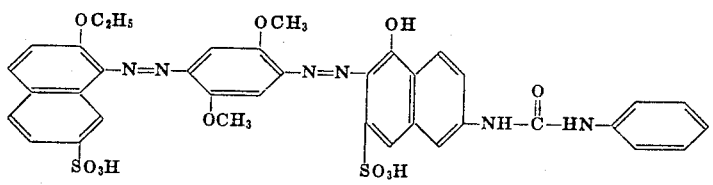

10. A light-sensitive material as defined in claim 1 wherein the azo dye has the following formula:

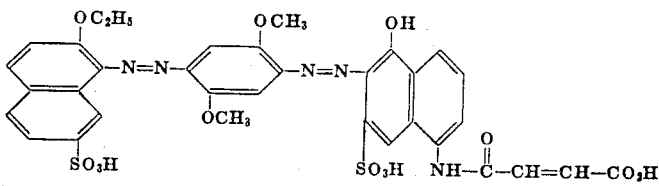

11. A light-sensitive material as defined in claim 1 in which the emulsion is sensitized to red.

UNITED STATES PATENT OFFICE
CERTIFICATE OF CORRECTION

Patent No. 3,615,581　　　　　　　　　　Dated　October 26, 1971

Inventor(s)　Karlheinz Käbitzke et al

It is certified that error appears in the above-identified patent and that said Letters Patent are hereby corrected as shown below:

Column 2, line 19, symbol "Z" has been omitted;
Column 19, in claim 1, the symbols of the substituents in $R_1$, $R_2$ and $R_3$, in lines 9 to 11, should be printed more clearly;
Column 19, in claim 2, line 25, the index $\underline{1}$ of "$R_1$" has been omitted;
Column 19, in claim 3, line 36, the index $\underline{2}$ of "$R_2$" has been omitted;
Column 19, in claim 3, line 45, the index $\underline{3}$ of "$R_3$" has been omitted.

Signed and sealed this 25th day of July 1972.

(SEAL)
Attest:

EDWARD M. FLETCHER, JR.　　　　ROBERT GOTTSCHALK
Attesting Officer　　　　　　　　Commissioner of Patents